(12) United States Patent
Wang et al.

(10) Patent No.: US 12,273,900 B2
(45) Date of Patent: Apr. 8, 2025

(54) RESOURCE ALLOCATION METHOD AND COMMUNICATION DEVICE

(71) Applicant: DATANG MOBILE COMMUNICATIONS EQUIPMENT CO., LTD., Beijing (CN)

(72) Inventors: Ying Wang, Beijing (CN); Yali Zhao, Beijing (CN); Jiancheng Sun, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 588 days.

(21) Appl. No.: 17/285,766

(22) PCT Filed: Oct. 30, 2019

(86) PCT No.: PCT/CN2019/114329
§ 371 (c)(1),
(2) Date: Apr. 15, 2021

(87) PCT Pub. No.: WO2020/088519
PCT Pub. Date: May 7, 2020

(65) Prior Publication Data
US 2021/0392636 A1    Dec. 16, 2021

(30) Foreign Application Priority Data

Nov. 1, 2018  (CN) .......................... 201811294982.4
Oct. 25, 2019  (CN) .......................... 201911025734.4

(51) Int. Cl.
*H04W 72/51* (2023.01)
*H04W 4/40* (2018.01)
(Continued)

(52) U.S. Cl.
CPC ............ *H04W 72/51* (2023.01); *H04W 4/40* (2018.02); *H04W 28/0278* (2013.01);
(Continued)

(58) Field of Classification Search
CPC ... H04W 4/40; H04W 28/0278; H04W 72/23; H04W 72/51; H04W 80/12; H04W 88/085; H04W 92/12; H04W 92/18
See application file for complete search history.

(56) References Cited

U.S. PATENT DOCUMENTS

2018/0132208 A1* 5/2018 Pan ..................... H04W 72/20
2019/0045507 A1* 2/2019 Sorrentino ........ H04W 72/1268
(Continued)

FOREIGN PATENT DOCUMENTS

| CN | 107135502 A | 9/2017 |
|---|---|---|
| CN | 108513325 A | 9/2018 |
| CN | 108541032 A | 9/2018 |
| WO | 2020/071878 A1 | 4/2020 |

OTHER PUBLICATIONS

Extended European Search Report from corresponding EP app. No. 19879471.1, dated Nov. 9, 2021, all pages.
(Continued)

*Primary Examiner* — Thomas R Cairns
*Assistant Examiner* — Kai Chang
(74) *Attorney, Agent, or Firm* — Ladas & Parry, LLP

(57) ABSTRACT

A resource allocation method and a communication device are provided. The resource allocation method of the present disclosure is operable by a base station, the base station includes a Central Unit (CU) and a Distributed Unit (DU) connected to the CU. The method includes: determining, by the DU, a Sidelink (SL) resource allocation mode; and allocating, by the DU, SL resource for a UE according to the determined resource allocation mode and User Equipment (UE) context information.

4 Claims, 5 Drawing Sheets

(51) Int. Cl.
*H04W 28/02* (2009.01)
*H04W 72/23* (2023.01)
*H04W 80/12* (2009.01)
*H04W 88/08* (2009.01)
*H04W 92/18* (2009.01)

(52) U.S. Cl.
CPC ............ *H04W 72/23* (2023.01); *H04W 80/12* (2013.01); *H04W 88/085* (2013.01); *H04W 92/18* (2013.01)

(56) References Cited

U.S. PATENT DOCUMENTS

| | | | |
|---|---|---|---|
| 2019/0149365 A1* | 5/2019 | Chatterjee | H04L 5/0094 370/329 |
| 2019/0166559 A1* | 5/2019 | Chen | H04W 76/10 |
| 2019/0223231 A1* | 7/2019 | Muraoka | H04W 76/10 |
| 2019/0246420 A1* | 8/2019 | Park | H04W 72/23 |
| 2019/0313364 A1* | 10/2019 | Liang | H04W 76/25 |
| 2020/0120674 A1* | 4/2020 | Lee | H04W 72/0453 |
| 2020/0229049 A1 | 7/2020 | Wu et al. | |
| 2020/0236581 A1* | 7/2020 | Zhang | H04W 28/082 |
| 2020/0260496 A1* | 8/2020 | Jin | H04W 74/0833 |
| 2021/0076351 A1* | 3/2021 | Gao | H04W 76/11 |
| 2021/0176610 A1* | 6/2021 | You | H04W 72/23 |
| 2021/0176734 A1* | 6/2021 | You | H04W 72/02 |
| 2021/0195430 A1* | 6/2021 | You | H04W 72/04 |
| 2021/0251023 A1* | 8/2021 | Phan | H04W 4/70 |
| 2022/0053478 A1* | 2/2022 | Xu | H04W 72/51 |
| 2024/0049274 A1* | 2/2024 | Luo | H04W 72/0446 |

OTHER PUBLICATIONS

Huawei, "Support for Advanced V2X Use Cases", R3-185716, 3GPP TSG-RAN3 Meeting #101-bis, Chengdu, China, Oct. 8-12, 2018, all pages.
Huawei, "(TP for V2X BL CR for TS 38.473) F1 impacts for support of V2X", R3-195085, 3GPP TSG-RAN3 Meeting #105bis, ChongQing, China, Oct. 14-18, 2019, all pages.
3rd Generation Partnership Project; Technical Specification Group Radio Access Network; NR; Study on Vehicle-to-Everything (Release 16), 3GPP TR 38.885 V0.1.0, Oct. 2018, all pages.
3rd Generation Partnership Project; Technical Specification Group Radio Access Network; NG-RAN; F1 application protocol (F1 AP) (Release 15), 3GPP TS 38.473 V15.3.0, Sep. 2018, all pages.
Office Action for European Patent Application 19879471.1 issued on Aug. 23, 2022 by the European Patent Office.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)" 3GPP TS 36.300 V15.2.0, Jul. 7, 2018, all pages.
"On the ways of SI message generation and transportation in disaggregated gNB", R3-173043, 3GPP TSG-RAN3 #97, Berlin, Germany, Aug. 21-25, 2017, all pages.
"System Information Support over V1 interface", R3-174430, 3GPP TSG-RAN3 Meeting #98, Reno, Nevada, USA, Nov. 27-Dec. 1, 2017, all pages.
International Search Report from PCT/CN2019/114329, dated Feb. 6, 2020, with English translation from WIPO, all pages.
Written Opinion of the International Searching Authority from PCT/CN2019/114329, dated Feb. 6, 2020, with English translation from WIPO, all pages.
International Preliminary Report on Patentability from PCT/CN2019/114329, dated Apr. 27, 2021, with English translation from WIPO, all pages.
First Office Action for the corresponding Korean Patent Application No. 10-2021-7015018 issued on Jun. 26, 2023 and its machine English Translation provided by Korean Patent office.
3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13), 3GPP TS 36.300 V 13.12.0 (Jun. 2018), all pages.

* cited by examiner

RESOURCE ALLOCATION METHOD AND COMMUNICATION DEVICE

CROSS-REFERENCE TO RELATED APPLICATIONS

This application is the U.S. national phase of PCT Application No. PCT/CN2019/114329 filed on Oct. 30, 2019, which claims a priority to Chinese Patent Application No. 201811294982.4 filed in China on Nov. 1, 2018, and a priority to Chinese Patent Application No. 201911025734.4 filed in China on Oct. 25, 2019, the disclosures of which are incorporated in their entireties herein by reference.

TECHNICAL FIELD

The present disclosure relates to the technical field of communication application, in particular to a resource allocation method and a communication device.

BACKGROUND

A Sidelink (Sind link, SL) interface of a 5G New Radio (NR) system supports a resource allocation mode scheduled by a network and a resource allocation mode selected by the UE on its own, and for a distributed architecture (when a 5G base station is a gNB), a base station can perform appropriate SL resource allocation according to a request of a User Equipment (UE). The NR system also supports a centralized architecture (a gNB is separated into two logical nodes, i.e. a Central Unit (CU) and a Distributed Unit (DU)), but there is no relevant scheme in how to design an appropriate SL resource allocation mechanism in a CU-DU separated architecture.

SUMMARY

An objective of the present disclosure is to provide a resource allocation method and a communication device, so as to solve the problem that there is no relevant scheme in how to design an appropriate SL resource allocation mechanism in a CU-DU separated architecture.

In order to achieve the above objective, the present disclosure provides a resource allocation method operable by a base station, the base station including a Central Unit (CU) and a Distributed Unit (DU) connected to the CU, the method including:
  determining, by the DU, a Sidelink (SL) resource allocation mode; and
  allocating, by the DU, SL resource for a UE according to the determined resource allocation mode and User Equipment (UE) context information.

The step of determining, by the DU, the SL resource allocation mode, includes:
  determining, by the DU, the SL resource allocation mode according to a request message of the UE and a local policy.

The SL resource allocation mode determined by the DU is a resource allocation mode selected by a UE on its own;
  the step of allocating, by the DU, the SL resource for the UE according to the determined resource allocation mode and the UE context information, includes:
  allocating, by the DU, an SL resource pool for the UE according to UE V2X context information and SL UE message.

Before the step of allocating, by the DU, the SL resource pool for the UE according to the UE V2X context information and the SL UE message, the method further includes:
  acquiring, by the DU, part or all of content in the SL UE message through an F1 application protocol message transmitted by the CU.

The part of the content in the SL UE message includes: at least one of a frequency, a service Identification (ID) and the UE V2X context information.

The SL resource allocation mode determined by the DU is a resource allocation mode scheduled by a network;
  the step of allocating, by the DU, the SL resource for the UE according to the determined resource allocation mode and the UE context information, includes:
  after receiving, by the DU, a UE Scheduling Request (SR), allocating, by the DU, an uplink grant resource according to the UE V2X context information being stored, and transmitting, by the DU, the uplink grant resource to the UE; and
  after receiving, by the DU, a Buffer State Report (BSR) transmitted by the UE, allocating, by the DU, the SL resource to the UE according to the stored UE V2X context information.

Before the step of after receiving, by the DU, the UE SR, allocating, by the DU, the uplink grant resource according to the UE V2X context information being stored, and transmitting the uplink grant resource to the UE, the resource allocation method further includes:
  acquiring, by the DU, the UE V2X context information transmitted by the CU.

The UE V2X context information is transmitted by the CU through a UE context management process of an F1 application protocol when the UE initially accesses the network; or
  the UE V2X context information is transmitted by the CU through a message related to an F1 application protocol after the UE transmits the SL UE message.

The SL resource allocation mode determined by the DU is a resource allocation mode scheduled by a network;
  the step of allocating, by the DU, the SL resource for the UE according to the determined resource allocation mode and the UE context information, includes:
  acquiring, by the DU, Semi-Persistent Scheduling (SPS) assistance information that is related to the UE V2X context information and transmitted by the CU;
  generating, by the DU, SPS configuration information according to the stored UE V2X context information and the SPS assistance information, and transmitting, by the DU, the SPS configuration information to the CU; and after the CU notifies the UE of the SPS configuration information, notifying, by the DU, the UE of SPS resource configuration information.

The UE V2X context information includes at least one of: V2X authorization information; a maximum UE aggregation rate of a SL interface; a mapping relationship between a transmission configuration table of the SL interface and destination L2 identifications; a Quality of Service (QoS) parameter of a service flow; a mapping relationship between SR resources of a Uu interface.

In order to achieve the above objective, an embodiment of the present disclosure further provides a communication device, wherein the communication device is a base station, and the base station includes a CU and a DU connected to the CU, and further includes: a transceiver, a memory, a processor, and a program stored on the memory and executable by the processor, wherein when the processor executes the program, following steps are implemented:
  determining, by the DU, a SL resource allocation mode; and
  allocating, by the DU, SL resource for a UE according to the determined resource allocation mode and UE context information.
When the processor executes the program, a following step is further implemented:
  determining, by the DU, the SL resource allocation mode according to a request message of the UE and a local policy.
The SL resource allocation mode determined by the DU is a resource allocation mode selected by the UE on its own;
  when the processor executes the program, a following step is further implemented:
  allocating, by the DU, an SL resource pool for the UE according to UE V2X context information and SL UE message.
When the processor executes the program, a following step is further implemented:
  acquiring, by the DU, part or all of content in the SL UE message through an F1 application protocol message transmitted by the CU.
The part of the content in the SL UE message includes: at least one of a frequency, a service ID and the UE V2X context information.
The SL resource allocation mode determined by the DU is a resource allocation mode scheduled by a network;
  when the processor executes the program, following steps are further implemented:
  after receiving, by the DU, a UE SR, allocating, by the DU, an uplink grant resource according to the UE V2X context information being stored, and transmitting, by the DU, the uplink grant resource to the UE; and
  after receiving, by the DU, a BSR transmitted by the UE, allocating, by the DU, the SL resource to the UE according to the stored UE V2X context information.
When the processor executes the program, a following step is further implemented:
  acquiring, by the DU, the UE V2X context information transmitted by the CU.
The UE V2X context information is transmitted by the CU through a UE context management process of an F1 application protocol when the UE initially accesses the network; or
  the UE V2X context information is transmitted by the CU through a message related to an F1 application protocol after the UE transmits the SL UE message.
The SL resource allocation mode determined by the DU is a resource allocation mode scheduled by a network;
  when the processor executes the program, following steps are further implemented:
  acquiring, by the DU, SPS assistance information that is related to the UE V2X context information and transmitted by the CU;
  generating, by the DU, SPS configuration information according to the stored UE V2X context information and the SPS assistance information, and transmitting, by the DU, the SPS configuration information to the CU; and
  after the CU notifies the UE of the SPS configuration information, notifying, by the DU, the UE of SPS resource configuration information.
The UE V2X context information includes at least one of: V2X authorization information; a maximum UE aggregation rate of a SL interface; a mapping relationship between a transmission configuration table of the SL interface and destination L2 identifications; a QoS parameter of a service flow; a mapping relationship between SR resources of a Uu interface.

In order to achieve the above object, an embodiment of the present disclosure further provide a computer-readable storage medium having a computer program stored thereon, wherein when the computer program is executed by a processor, the steps of the resource allocation method as described above are implemented.

In order to achieve the above object, an embodiment of the present disclosure further provides a communication device, wherein the communication device is a base station, the base station includes a CU and a DU connected to the CU, wherein the communication device includes:
  a determination module, configured for determining, by the DU, a SL resource allocation mode; and
  an allocation module, configured for allocating, by the DU, a SL resource for a UE according to the determined resource allocation mode and UE context information.

The SL resource allocation mode determined by the DU is a resource allocation mode selected by the UE on its own;
  the allocation module is configured for allocating, by the DU or the CU, an SL resource pool for the UE according to UE V2X context information and SL UE message.

The communication device further includes:
  a first acquisition module, configured for, before allocating, by the DU, the SL resource pool for the UE according to the UE V2X context information and the SL UE message, acquiring, by the DU, part or all of content in the SL UE message through an F1 application protocol message transmitted by the CU.

The SL resource allocation mode determined by the DU is a resource allocation mode scheduled by a network;
  the allocation module includes:
  a first transmitting submodule, configured for, after receiving, by the DU, a UE SR, allocating, by the DU, an uplink grant resource according to the UE V2X context information being stored, and transmitting, by the DU, the uplink grant resource to the UE; and
  an allocation submodule, configured for, after receiving, by the DU, a BSR transmitted by the UE, allocating, by the DU, the SL resource to the UE according to the stored UE V2X context information.

The SL resource allocation mode determined by the DU is a resource allocation mode scheduled by a network;
  the allocation module includes:
  an acquisition submodule, configured for acquiring, by the DU, SPS assistance information that is related to the UE V2X context information and transmitted by the CU;
  a generation submodule, configured for generating, by the DU, SPS configuration information according to the stored UE V2X context information and the SPS assistance information, and transmitting, by the DU, the SPS configuration information to the CU; and
  an notification submodule, configured for, after the CU notifies the UE of the SPS configuration information, notifying, by the DU, the UE of SPS resource configuration information.

The embodiments of the present disclosure have the following beneficial effects:
  according to the technical schemes of the embodiments of the present disclosure, the DU determines the Sind Link (SL) resource allocation mode; and the DU allocates the SL resource for the UE according to the determined resource allocation mode and the UE context information, thereby achieving the purpose of designing an appropriate SL resource allocation mechanism in the CU-DU separated architecture.

BRIEF DESCRIPTION OF THE DRAWINGS

In order to more clearly illustrate the technical solutions of the embodiments of the present disclosure, the drawings that need to be used in the description of the embodiments of the present disclosure are briefly described below, and it is obvious that the drawings in the following description are only related to some embodiments of the present disclosure, and a person skilled in the art can obtain other drawings according to these drawings without involving any inventive effort.

DETAILED DESCRIPTION

Figure 1:
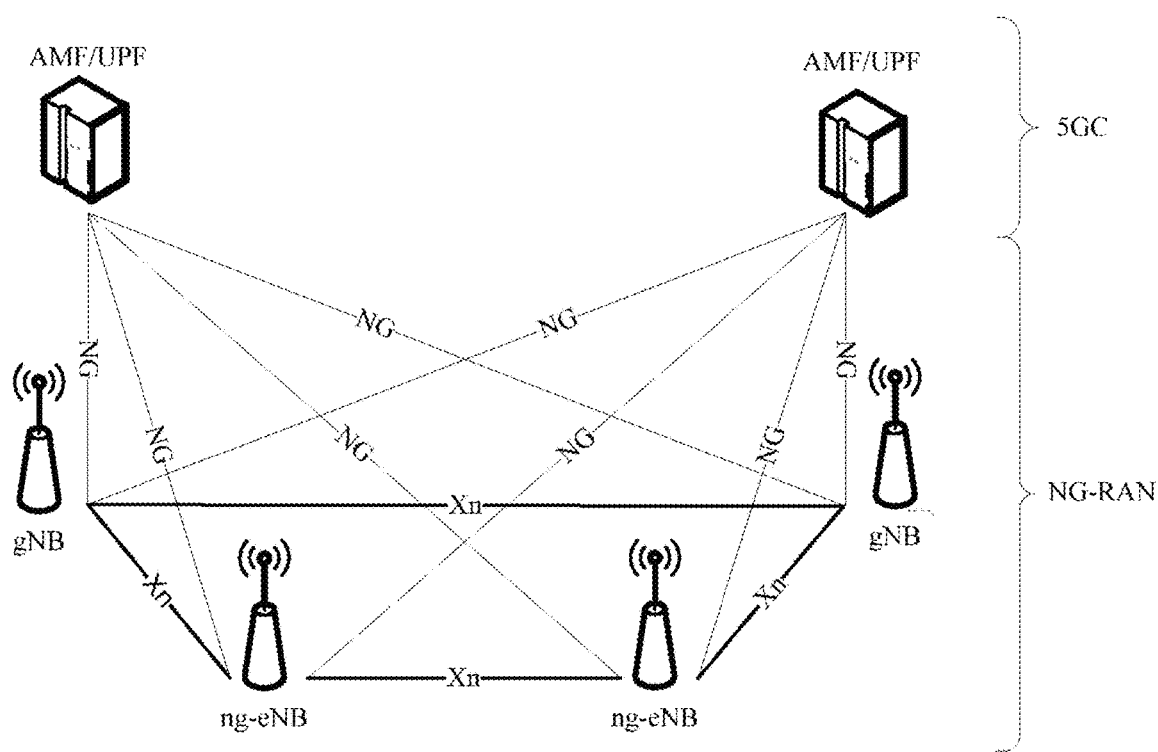
FIG. 1 is a structural diagram of a network system to which an embodiment of the present disclosure may be applied.

Exemplary embodiments of the present disclosure will be described in more detail below with reference to the accompanying drawings. While exemplary embodiments of the present disclosure are shown in the drawings, it should be understood that the present disclosure may be embodied in various forms and should not be limited to the embodiments set forth herein. Rather, these embodiments are provided so that the present disclosure will be thorough and complete, and will fully convey the scope of the present disclosure to a person skilled in the art.

The terms "include" and "have" and any variations thereof as used in the specification and claims of the present application are intended to cover a non-exclusive inclusion, such that a process, method, system, article, or apparatus that includes a list of steps or elements is not necessarily limited to those steps or elements expressly listed, but may include steps or elements not expressly listed or other steps or elements inherent to the process, method, article, or apparatus. In the description and in the claims, "and/or" denotes at least one of the connected objects.

The following description provides examples and is not intended to limit the scope, applicability, or configuration set forth in the claims. Changes may be made in the function and arrangement of elements discussed without departing from the spirit and scope of the present disclosure. Various examples may be suitably omitted, replaced, or various procedures or components are added. For example, the described method may be performed in a different order than described, and various steps may be added, omitted, or combined. In addition, features described with reference to certain examples may be combined in other examples.

To enable a person skilled in the art to better understand the embodiments of the present disclosure, a network system to which the embodiments of the present disclosure may be applied is described as follows.

As shown in FIG. 1, a Next Generation-Radio Access Network (NG-RAN) is composed of two logical nodes, i.e. a 5g base station (gNB) which is a protocol termination point of an NR control plane and a user plane provided to a UE, and an Long Term Evolution (LTE) base station (ng-eNB), which is a protocol termination point of an Evolved-UMTS (Universal Mobile Telecommunications System) Terrestrial Radio Access (E-UTRA) control plane and a user plane provided to the UE. The connections between the gNBs, between the ng-eNBs, and between the gNB and the ng-eNB are implemented through an Xn interface. The NG-RAN is connected to a 5GC through an NG interface, is connected to an Access and Mobility Management Function (AMF) through an NG-C interface, is connected to a User Plane Function (UPF) through an NG-U interface, and the NG interface supports a multiple-to-multiple connection mode.

Figure 2:
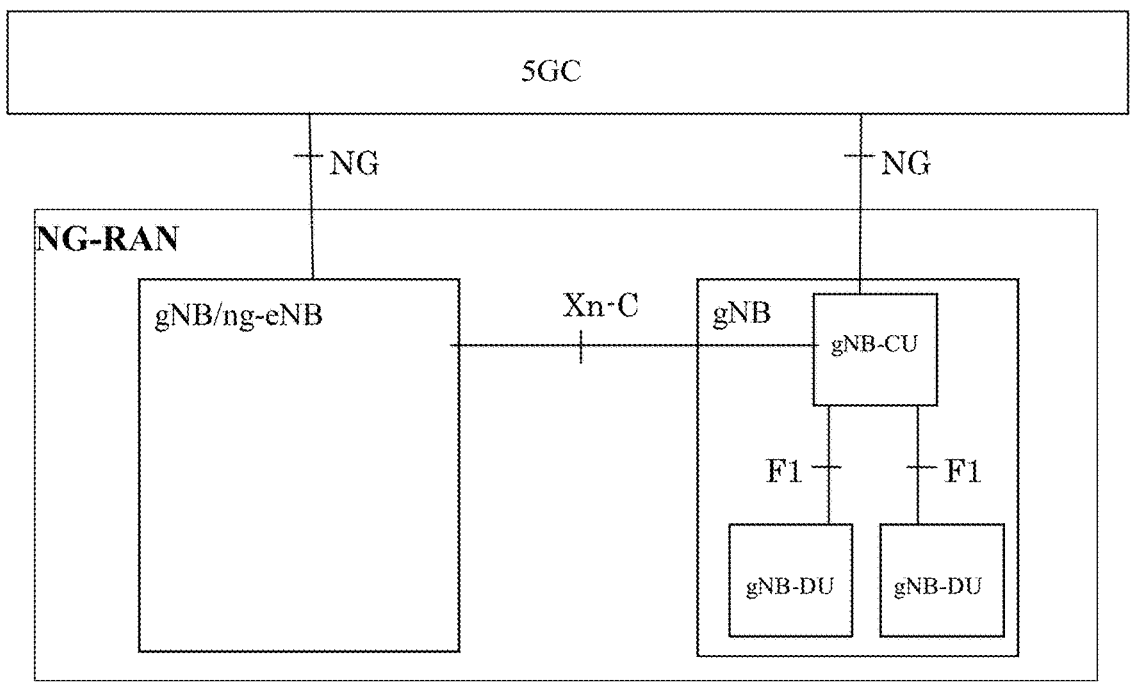
FIG. 2 is a schematic structural diagram showing that a gNB is separated into two nodes, i.e. a gNB-CU and a gNB-DU in an embodiment of the present disclosure.

As shown in FIG. 2, the gNB may be further separated into two nodes, i.e. a gNB-CU and a gNB-DU. The NR-RAN system supports a centralized architecture, and the network side needs to consider how to support the SL resource allocation mechanism in a CU-DU separated scenario.

Figure 3:
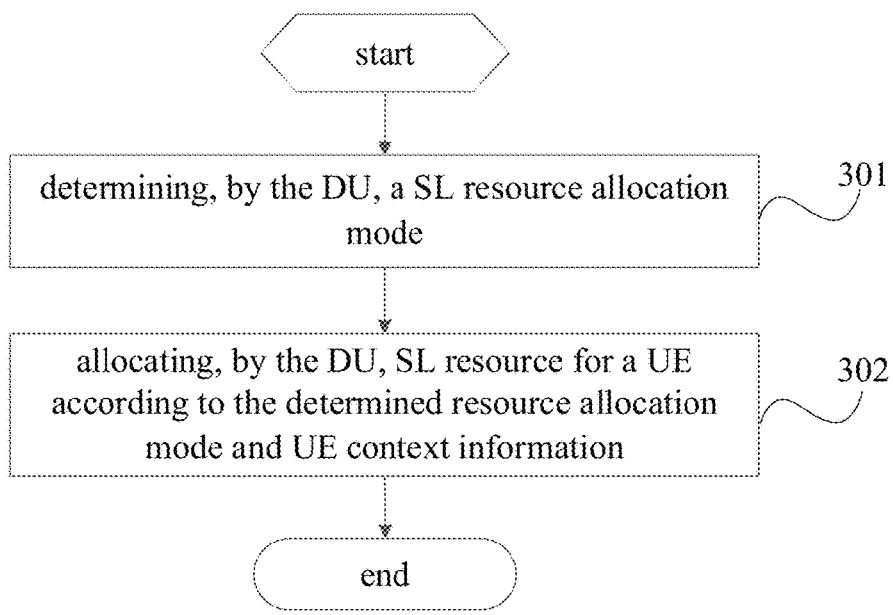
FIG. 3 is a flow diagram of a resource allocation method according to an embodiment of the present disclosure.

As shown in FIG. 3, an embodiment of the present disclosure provides a resource allocation method operable by a base station, the base station including a Central Unit (CU) and a Distributed Unit (DU) connected to the CU, and the method includes:

Step 301: determining, by the DU, a SL resource allocation mode.

Here, the DU determines the SL resource allocation mode according to a request message of a UE and a local policy.

Specifically, after the CU receives RRC SL UE message, the DU acquires part or all of the content in the SL UE message through the CU, determines the SL resource allocation mode according to the received request message of the UE and the local policy, and notifies the UE through a RRC reconfiguration message.

The SL resource allocation mode includes a resource allocation mode selected by the UE on its own and a resource allocation mode scheduled by a network.

The resource allocation mode scheduled by a network is that a base station allocates a resource required by data transmission for UE, and the UE receives downlink data or transmits uplink data according to a scheduling command of the base station. Two scheduling methods, i.e. a dynamic scheduling SR/BSR and Semi-Persistent Scheduling (SPS) are supported.

The dynamic scheduling is suitable for a service with random service data arrival time or an irregular data packet size:

the uplink data transmission is scheduled by the base station, and the base station scheduler notifies the UE through an Uplink grant (UL grant) after determining the uplink resource allocation condition. The uplink resource allocation of the base station scheduler is based on the amount of uplink data to be transmitted by the UE, i.e. a buffer state of the UE. The buffer is at the UE side, the UE needs to transmit a Buffer State Report (BSR) to the base station if the base station wants to know the information, and the base station allocates appropriate resource configuration information according to the BSR information and transmits the resource configuration information to the UE through a Physical Downlink Control Channel (PDCCH) signaling. When the UE has a BSR trigger, but the UE does not have a UL grant, a Scheduling Request (SR) is triggered.

The SPS is mainly suitable for services with a periodically arrived service data and a relatively fixed data packet size: the UE reports UE assistance information carrying SPS configuration assistance information to the base station, the base station performs SL SPS resource allocation according to the SPS configuration assistance information reported by the UE, and notifies the UE of the determined SL SPS resource allocation information.

The resource allocation mode selected by the UE on its own is that a base station controls the configuration of a resource pool, and the base station implements the dynamic configuration of the UE resource pool through a RRC reconfiguration message.

Step 302: allocating, by the DU, SL resource for a UE according to the determined resource allocation mode and User Equipment (UE) context information.

Based on the resource allocation mode scheduled by a network, the CU provides UE SL related context information to the DU, and the DU allocates appropriate SL resource configuration to the UE according to the UE SL context information provided by the CU. Based on the resource allocation mode selected by the UE on its own, the CU may allocate SL resource pool configuration according to the UE SL related context information; or the DU may allocate the SL resource pool configuration according to the UE SL related context information.

The UE context information includes: UE V2X context information. The UE V2X context information includes at least one of the following:

V2X authorization information; a maximum UE aggregation rate (PC5 AMBR) of a SL interface; a mapping relationship between a transmission configuration table (TX profiles) of the SL interface and destination L2 IDs; a Quality of Service (QoS) parameter of a service; a mapping relationship between SR resources of a Uu interface.

According to the resource allocation method of the embodiment of the present disclosure, the DU determines the SL resource allocation mode; and the CU and/or the DU allocates the SL resource for the UE according to the determined resource allocation mode and the UE context information, thereby achieving the purpose of designing an appropriate SL resource allocation mechanism under a CU-DU separated architecture.

Further, when the SL resource allocation mode determined by the DU is the resource allocation mode selected by the UE on its own; Step 302 of allocating, by the DU, the SL resource for the UE according to the determined resource allocation mode and the UE context information, includes:

allocating, by the DU, an SL resource pool for the UE according to UE V2X context information and SL UE message.

In the embodiment of the present disclosure, when the SL resource allocation mode determined by the DU is the resource allocation mode selected by the UE on its own, the DU may allocate the SL resource pool for the UE according to the UE V2X context information and the SL UE message.

When the DU allocates the SL resource pool for the UE, the DU also needs to acquire part or all of content in the SL UE message from the CU. Based on this, before the step of allocating, by the DU, the SL resource pool for the UE according to the UE V2X context information and the SL UE message, the resource allocation method of the embodiment of the present disclosure further includes:

acquiring, by the DU, part or all of content in the SL UE message through an F1 application protocol message transmitted by the CU.

The part of the content in the SL UE message includes: at least one of a frequency, a service Identification (ID) and the UE V2X context information.

The UE V2X context information includes at least one of the following:

V2X authorization information; a maximum UE aggregation rate (PC5 AMBR) of a SL interface; a mapping relationship between a transmission configuration table (TX profiles) of the SL interface and destination L2 IDs; a Quality of Service (QoS) parameter of a service; a mapping relationship between SR resources of a Uu interface.

The F1 application protocol (F1-AP) message may be a new F1-AP message or may reuse the existing F1-AP message, such as a UE context modification, a Downlink (DL) RRC message transmission.

The process of the resource allocation mode selected by the UE on its own in the embodiment of the present disclosure will be described with reference to Examples 1 and 2.

Example 1: the DU allocates the SL resource for the UE according to the determined resource allocation mode and the UE context information.

Figure 4:
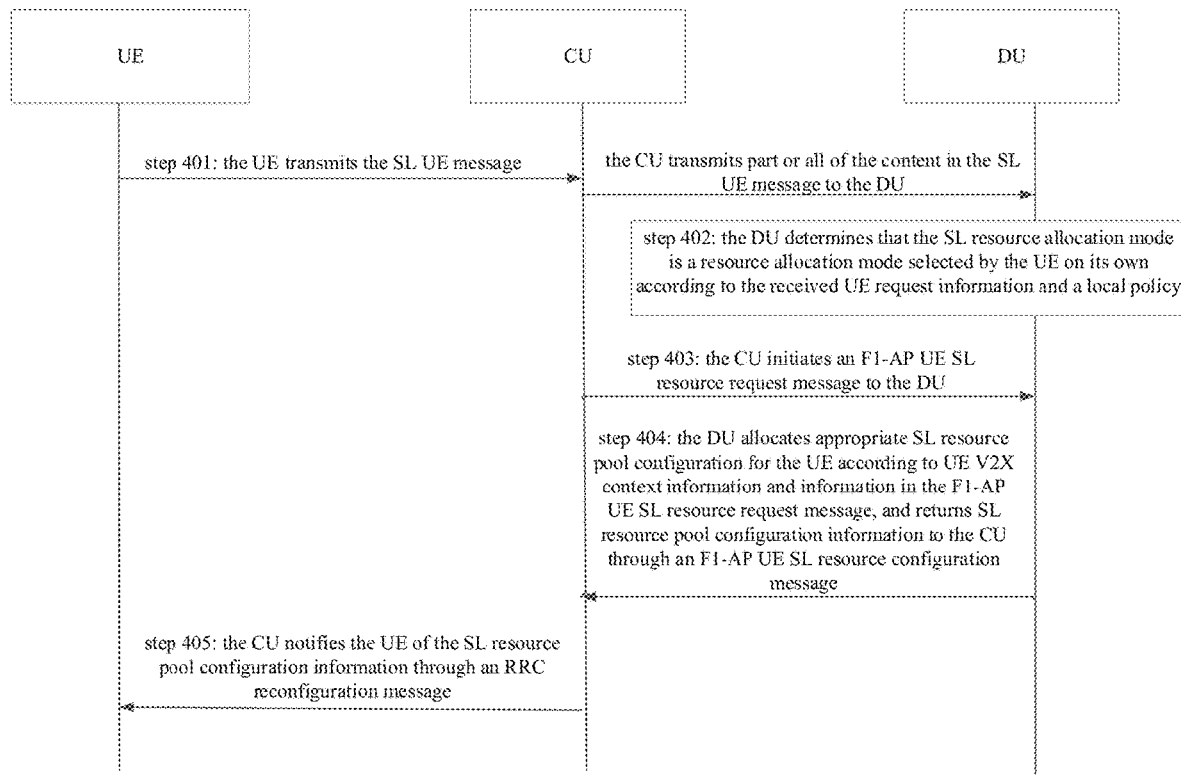
FIG. 4 is a first interaction diagram of a resource allocation method according to an embodiment of the present disclosure.

As shown in FIG. 4, the process includes:

step 401: the UE transmits the SL UE message to the CU.

step 402: the DU acquires part or all of the content in the sidelink UE message through the CU, and according to the received UE request information and the local policy, the DU determines that the SL resource allocation mode is a SL resource allocation mode selected by the UE on its own.

step 403: the CU initiates an F1-AP UE SL resource request message to the DU.

The F1-AP UE SL resource request message may carry all or part of the content in the SL UE message, such as a frequency, a service ID, a UE V2X context. The UE V2X context information here may also be carried in an F1-AP UE context establishment message and then transmitted to the DU when the UE initially accesses a network.

The UE V2X context information includes at least one of the following:

V2X authorization information; a maximum UE aggregation rate (PC5 AMBR) of a SL interface; a mapping relationship between a transmission configuration table (TX profiles) of the SL interface and destination L2 IDs; a Quality of Service (QoS) parameter of a service; a mapping relationship between SR resources of a Uu interface.

Step 404: the DU allocates an appropriate SL resource pool configuration for the UE according to the UE V2X context information and the information in the F1-AP UE SL resource request message, and returns SL resource pool configuration information to the CU through an F1-AP UE SL resource configuration message.

The F1-AP message in step 403 and step 404 may be a new F1-AP message, or may reuse the existing F1-AP messages, such as a UE context modification, a DL RRC message transmission.

Step 405: the CU notifies the UE of the SL resource pool configuration information through an RRC reconfiguration message.

Subsequently, the UE may transmit data on the allocated SL resource pool.

In Example 1, the CU initiates the F1-AP UE SL resource request message to the DU, the DU allocates the appropriate SL resource pool configuration for the UE according to the UE V2X context information and the information in the F1-AP UE SL resource request message, and returns the SL resource pool configuration information to the CU through the F1-AP UE SL resource configuration message.

Figure 5:
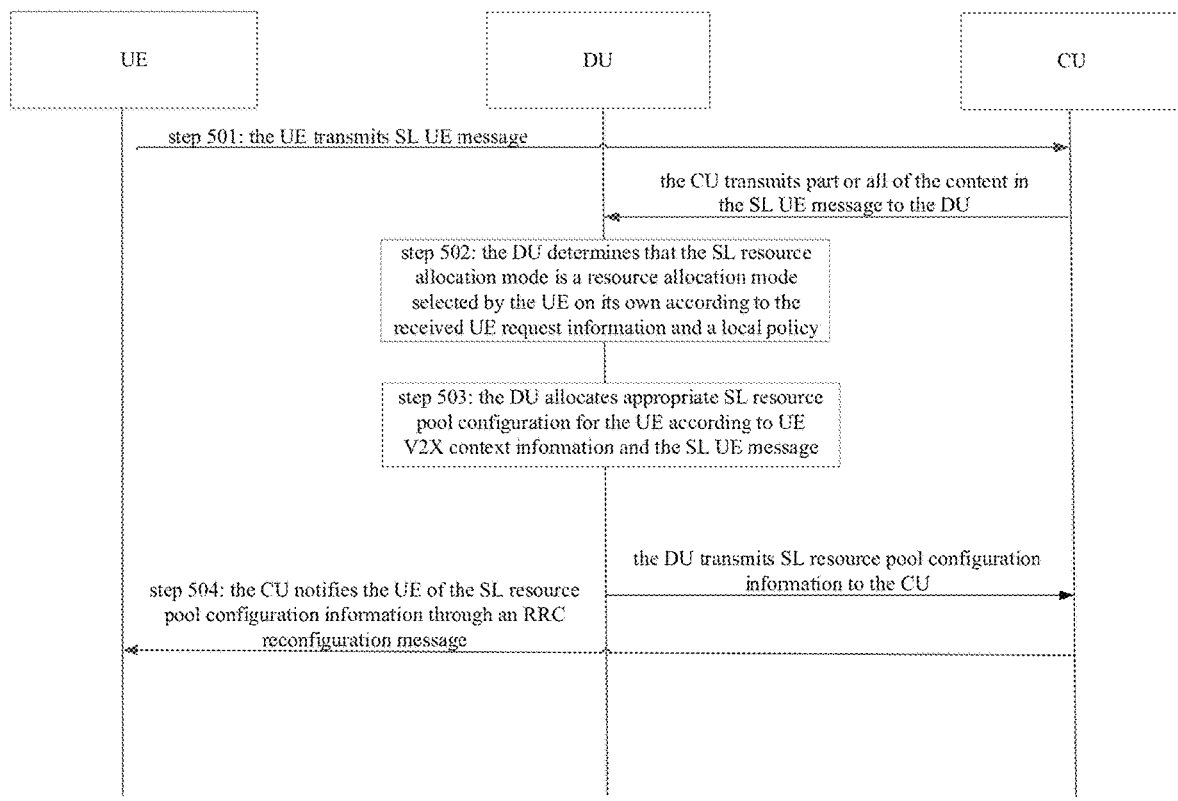
FIG. 5 is a second interaction diagram of a resource allocation method according to an embodiment of the present disclosure.

Example 2: the CU allocates the SL resource for the UE according to the determined resource allocation mode and the UE context information;

As shown in FIG. 5, the process includes:

Step 501: the UE transmits SL UE message to the CU.

Step 502: the DU acquires part or all of the content in the SL UE message through the CU, and the DU determines that the SL resource allocation mode is the resource allocation mode selected by the UE on its own according to the received UE request information and a local policy.

Step 503: the DU allocates appropriate SL resource pool configuration for the UE according to the UE V2X context information and the SL UE message.

The UE V2X context information includes at least one of the following:

V2X authorization information; a maximum UE aggregation rate (PC5 AMBR) of a SL interface; a mapping relationship between a transmission configuration table (TX profiles) of the SL interface and destination L2 IDs; a Quality of Service (QoS) parameter of a service; a mapping relationship between SR resources of a Uu interface.

Step 504: the DU transmits SL resource pool configuration information to the CU, and the CU notifies the UE of the SL resource pool configuration information through an RRC reconfiguration message.

Subsequently, the UE may transmit data on the allocated SL resource pool.

In Example 2, the CU allocates the appropriate SL resource pool configuration for the UE according to the UE V2X context information and the SL UE message.

Further, when the SL resource allocation mode determined by the DU is the resource allocation mode scheduled by a network; allocating, by the DU, the SL resource to the UE according to the determined resource allocation mode and the UE context information in step 502, includes:

after receiving, by the DU, a UE Scheduling Request (SR), allocating, by the DU, an uplink grant resource according to the UE V2X context information being stored, and transmitting, by the DU, the uplink grant resource to the UE; and after receiving, by the DU, a Buffer State Report (BSR) transmitted by the UE, allocating, by the DU, the SL resource to the UE according to the stored UE V2X context information.

Further, before the step of after receiving, by the DU, the UE SR, allocating, by the DU, the uplink grant resource according to the UE V2X context information being stored, and transmitting the uplink grant resource to the UE, the resource allocation method further includes:

acquiring, by the DU, the UE V2X context information transmitted by the CU.

The UE V2X context information is transmitted by the CU through a UE context management process of an F1 application protocol when the UE initially accesses the network; or the UE V2X context information is transmitted by the CU through a message related to an F1 application protocol after the UE transmits the SL UE message.

The UE V2X context information includes at least one of the following:

V2X authorization information; a maximum UE aggregation rate (PC5 AMBR) of a SL interface; a mapping relationship between a transmission configuration table (TX profiles) of the SL interface and destination L2 IDs; a Quality of Service (QoS) parameter of a service; a mapping relationship between SR resources of a Uu interface.

An illustration will be made below with reference to Example 3.

Figure 6:
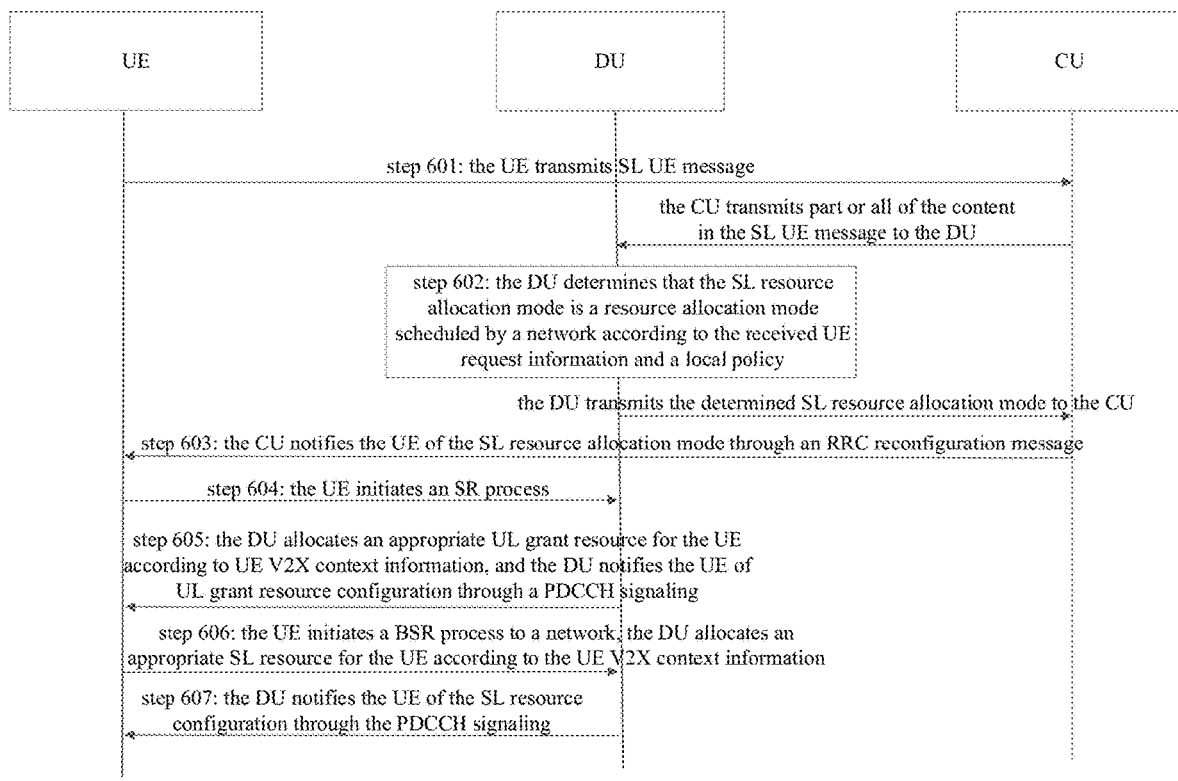
FIG. 6 is a third interaction diagram of a resource allocation method according to an embodiment of the present disclosure.

As shown in FIG. 6, the process includes:

step 601: the UE transmits SL UE message to the CU;

step 602: the DU acquires part or all of the content in the SL UE message through the CU, and the DU determines that the SL resource allocation mode is the resource allocation mode scheduled by a network according to the received UE request information and a local policy;

step 603: the DU transmits SL resource pool configuration information to the CU, and the CU notifies the UE of the SL resource allocation mode through an RRC reconfiguration message;

step 604: the UE initiates an SR process;

step 605: the DU allocates an appropriate UL grant resource to the UE according to the UE V2X context information, and the DU notifies the UE of UL grant resource configuration through a PDCCH signaling.

The UE V2X context information may be carried by the CU to the DU through an F1-AP UE context establishment message when the UE initially accesses a network, or may be carried by the CU to the DU through the F1-AP DL RRC message transmission process of the step 603, and the UE V2X context information includes at least one of the following:

V2X authorization information; a maximum UE aggregation rate (PC5 AMBR) of a SL interface; a mapping relationship between a transmission configuration table (TX profiles) of the SL interface and destination L2 IDs; a Quality of Service (QoS) parameter of a service; a mapping relationship between SR resources of a Uu interface.

Step 606: the UE initiates a BSR process to the network, and the DU allocates the appropriate SL resource to the UE according to the UE V2X context information.

Step 607: the DU notifies the UE of the SL resource configuration through the PDCCH signaling.

Subsequently, the UE may transmit data on the allocated SL resource.

In the resource allocation mode scheduled by a network, the DU allocates the appropriate SL resource to the UE according to the UE V2X context information.

Further, when the SL resource allocation mode determined by the DU is the resource allocation mode scheduled by a network; allocating, by the DU, the SL resource to the UE according to the determined resource allocation mode and the UE context information in the step 602, includes:

acquiring, by the DU, Semi-Persistent Scheduling (SPS) assistance information that is related to the UE V2X context information and transmitted by the CU;

generating, by the DU, SPS configuration information according to the stored UE V2X context information and the SPS assistance information, and transmitting, by the DU, the SPS configuration information to the CU; and after the CU notifies the UE of the SPS configuration information, notifying, by the DU, the UE of SPS resource configuration information.

An illustration will be made below with reference to Example 4.

Figure 7:
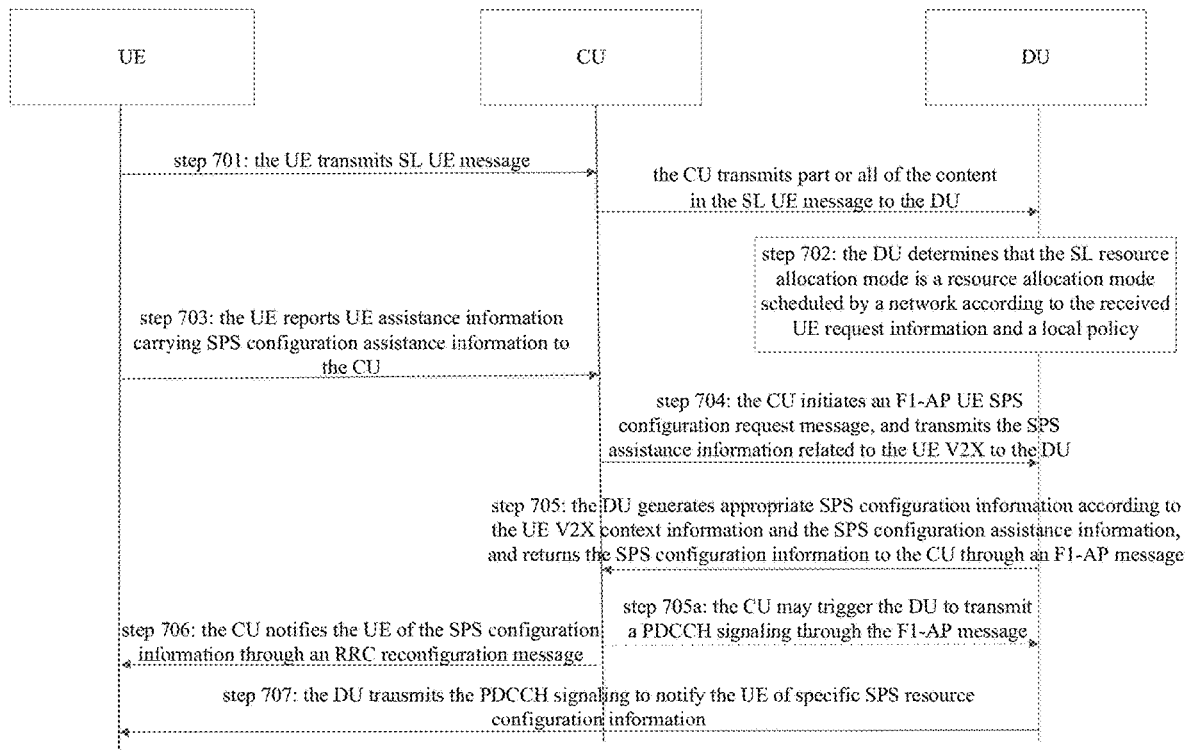
FIG. 7 is a fourth interaction diagram of a resource allocation method according to an embodiment of the present disclosure.

As shown in FIG. 7, the process includes:

step 701: the UE transmits SL UE message to the CU.

step 702: the DU acquires part or all of the content in the SL UE message through the CU, and the DU determines that the SL resource allocation mode is the resource allocation mode scheduled by a network according to the received UE request information and a local policy.

step 703: the UE reports UE assistance information carrying SPS configuration assistance information to the CU.

step 704: the CU initiates an F1-AP UE SPS configuration request message, and transmits the SPS assistance information related to the UE V2X to the DU; wherein the SPS assistance information related to the UE V2X may include information such as a traffic pattern;

step 705: the DU generates appropriate SPS configuration information according to the UE V2X context information and the SPS configuration assistance information, and returns the SPS configuration information to the CU through an F1-AP message.

The UE V2X context information may be carried by the CU to the DU through an F1-AP UE context establishment message when the UE initially accesses a network. The UE V2X context information includes at least one of the following:

V2X authorization information; a maximum UE aggregation rate (PC5 AMBR) of a SL interface; a mapping relationship between a transmission configuration table (TX profiles) of the SL interface and destination L2 IDs; a Quality of Service (QoS) parameter of a service; a mapping relationship between SR resources of a Uu interface.

The F1-AP messages of the step 704 and the step 705 as described above may be new F1-AP messages, or may reuse the existing F1-AP messages such as a UE context modification, a DL RRC message transmission.

Step 705a: the CU may trigger the DU to transmit a PDCCH signaling through the F1-AP message.

This step is optional.

Step 706: the CU notifies the UE of the SPS configuration information through an RRC reconfiguration message.

Step 707: the DU transmits the PDCCH signaling to notify the UE of specific SPS resource configuration information.

Subsequently, the UE may transmit data on the allocated SL resource pool.

According to the resource allocation method of the embodiment of the present disclosure, the DU determines the SL resource allocation mode; and the DU allocates the SL resource for the UE according to the determined resource allocation mode and the UE context information, thereby achieving the purpose of designing an appropriate SL resource allocation mechanism under a CU-DU separated architecture.

Figure 8:
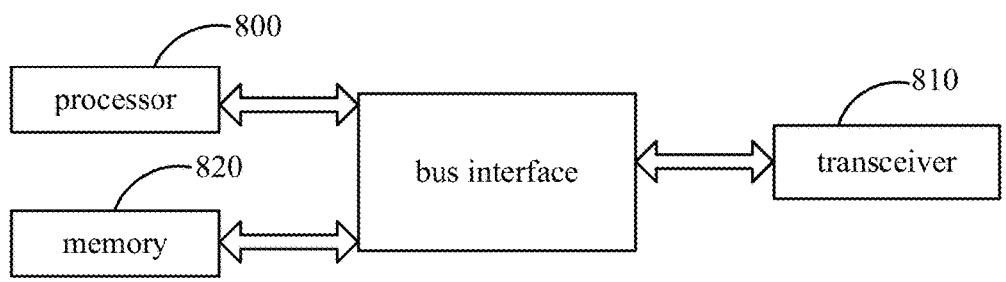
FIG. 8 is a block diagram of communication device according to an embodiment of the present disclosure.

As shown in FIG. 8, an embodiment of the present disclosure further provides communication device, which is specifically a base station, the base station including a Central Unit (CU) and a Distributed Unit (DU) connected to the CU, and further including: a memory 820; a processor 800; a transceiver 810; a bus interface, and a computer program stored on the memory 820 and executable on the processor 800, wherein the processor 800 is configured for reading the program in the memory 820 to perform the following processes:

determining, by the DU, a SL resource allocation mode; and allocating, by the DU, SL resource for a UE according to the determined resource allocation mode and UE context information.

In FIG. 8, a bus architecture may include any quantity of interconnected buses and bridges, and connects various circuits including one or more processors represented by the processor 800 and memory represented by the memory 820. The bus architecture may also connect various other circuits such as peripherals, voltage regulators and power management circuits, which is well known in the art. Therefore, a detailed description thereof is omitted herein. A bus interface provides an interface. The transceiver 802 may be multiple elements, such as a transmitter and a receiver, to allow for communication with various other apparatuses on the transmission medium. The processor 800 is responsible for supervising the bus architecture and normal operation and the memory 820 may store the data being used by the processor 800 during operation.

Optionally, the processor 800 may execute the computer program to further implement the following steps:

determining, by the DU, the SL resource allocation mode according to a request message of the UE and a local policy.

Optionally, the SL resource allocation mode determined by the DU is a resource allocation mode selected by the UE on its own;

the processor 800 may execute the computer program to further implement the following steps:

allocating, by the DU, an SL resource pool for the UE according to UE V2X context information and SL UE message.

Optionally, the processor 800 may executes the computer program to further implement the following steps:

acquiring, by the DU, part or all of content in the SL UE message through an F1 application protocol message transmitted by the CU.

Optionally, the part of the content in the SL UE message includes: at least one of a frequency, a service ID and the UE V2X context information.

Optionally, the SL resource allocation mode determined by the DU is a resource allocation mode scheduled by a network;

the processor 800 may executes the computer program to further implement the following steps:

after receiving, by the DU, a UE SR, allocating, by the DU, an uplink grant resource according to the UE V2X context information being stored, and transmitting, by the DU, the uplink grant resource to the UE; and after receiving, by the DU, a BSR transmitted by the UE, allocating, by the DU, the SL resource to the UE according to the stored UE V2X context information.

Optionally, the processor 800 may execute the computer program to further implement the following steps:

acquiring, by the DU, the UE V2X context information transmitted by the CU.

Optionally, the UE V2X context information is transmitted by the CU through a UE context management process of an F1 application protocol when the UE initially accesses the network; or the UE V2X context information is transmitted by the CU through a message related to an F1 application protocol after the UE transmits the SL UE message.

Optionally, the SL resource allocation mode determined by the DU is a resource allocation mode scheduled by a network;

the processor 800 may executes the computer program to further implement the following steps:

acquiring, by the DU, SPS assistance information that is related to the UE V2X context information and transmitted by the CU;

generating, by the DU, SPS configuration information according to the stored UE V2X context information and the SPS assistance information, and transmitting, by the DU, the SPS configuration information to the CU; and after the CU notifies the UE of the SPS configuration information, notifying, by the DU, the UE of SPS resource configuration information.

Optionally, the UE V2X context information includes at least one of the following:

V2X authorization information; a maximum UE aggregation rate of a SL interface; a mapping relationship between a transmission configuration table of the SL interface and destination L2 identifications; a QoS parameter of a service flow; a mapping relationship between SR resources of a Uu interface.

According to the communication device of the embodiment of the present disclosure, the DU determines the SL resource allocation mode; and the DU allocates the SL resource for the UE according to the determined resource allocation mode and the UE context information, thereby achieving the purpose of designing an appropriate SL resource allocation mechanism under a CU-DU separated architecture.

In some embodiments of the present disclosure, a computer-readable storage medium having a computer program stored thereon is further provided, wherein when the computer program is executed by a processor, the following steps are implemented:

determining, by the DU, a SL resource allocation mode; and allocating, by the DU, SL resource for a UE according to the determined resource allocation mode and UE context information.

The program, when executed by a processor, enables the implementation of all of the above-described method embodiments, which are not described in detail here in order to avoid repetition.

Figure 9:
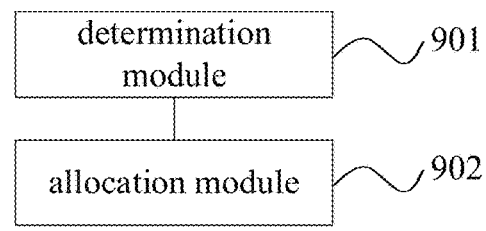
FIG. 9 is a diagram of modules of communication device according to an embodiment of the present disclosure.

As shown in FIG. 9, an embodiment of the present disclosure further provides a communication device, which is a base station including a Central Unit (CU) and a Distributed Unit (DU) connected to the CU, and the communication device includes:

a determination module 901, configured for determining, by the DU, a SL resource allocation mode; and an allocation module 902, configured for allocating, by the DU, a SL resource for a UE according to the determined resource allocation mode and UE context information.

According to the communication device of the embodiment of the present disclosure, the determining module is configured for determining the SL resource allocation mode through the DU according to a request message of the UE and a local policy.

According to the communication device of the embodiment of the present disclosure, the SL resource allocation mode determined by the DU is a resource allocation mode selected by the UE on its own;

the allocation module is configured for allocating, by the DU, an SL resource pool for the UE according to UE V2X context information and SL UE message.

The communication device of the embodiment of the present disclosure further includes:

a first acquisition module, configured for, before allocating, by the DU, the SL resource pool for the UE according to the UE V2X context information and the SL UE message, acquiring, by the DU, part or all of content in the SL UE message through an F1 application protocol message transmitted by the CU.

According to the communication device of the embodiment of the present disclosure, the part of the content in the SL UE message includes: at least one of a frequency, a service ID and the UE V2X context information.

According to the communication device of the embodiment of the present disclosure, the SL resource allocation mode determined by the DU is a resource allocation mode scheduled by a network;

the allocation module includes:

a first transmitting submodule, configured for, after receiving, by the DU, a UE SR, allocating, by the DU, an uplink grant resource according to the UE V2X context information being stored, and transmitting, by the DU, the uplink grant resource to the UE; and an allocation submodule, configured for, after receiving, by the DU, a BSR transmitted by the UE, allocating, by the DU, the SL resource to the UE according to the stored UE V2X context information.

The communication device of the embodiment of the present disclosure further includes:

a second acquisition module, configured for acquiring, by the DU, the UE V2X context information transmitted by the CU.

According to the communication device of the embodiment of the present disclosure, the UE V2X context information is transmitted by the CU through a UE context management process of an F1 application protocol when the UE initially accesses the network; or the UE V2X context information is transmitted by the CU through a message related to an F1 application protocol after the UE transmits the SL UE message.

According to the communication device of the embodiment of the present disclosure, the SL resource allocation mode determined by the DU is a resource allocation mode scheduled by a network;

the allocation module includes:

an acquisition submodule, configured for acquiring, by the DU, SPS assistance information that is related to the UE V2X context information and transmitted by the CU;

a generation submodule, configured for generating, by the DU, SPS configuration information according to the stored UE V2X context information and the SPS assistance information, and transmitting, by the DU, the SPS configuration information to the CU; and an notification submodule, configured for, after the CU notifies the UE of the SPS configuration information, notifying, by the DU, the UE of SPS resource configuration information.

According to the communication device of the embodiment of the present disclosure, the UE V2X context information includes at least one of the following:

V2X authorization information; a maximum UE aggregation rate of a SL interface; a mapping relationship between a transmission configuration table of the SL interface and destination L2 identifications; a QoS parameter of a service flow; a mapping relationship between SR resources of a Uu interface.

According to the communication device of the embodiment of the present disclosure, the DU determines the SL resource allocation mode; and the CU and/or the DU allocates the SL resource for the UE according to the determined resource distribution mode and the UE context information, thereby achieving the purpose of designing an appropriate SL resource allocation mechanism under a CU-DU separated architecture.

In various embodiments of the present disclosure, it should be understood that the order of the processes described above is not meant to imply an order of execution, and that the order of execution of the processes should be determined by their function and inherent logic, and should not be construed as limiting the implementation of the embodiments of the present disclosure in any way.

In the embodiments provided by the present disclosure, it should be understood that the disclosed apparatus and methods may be implemented in other ways. For example, the embodiments of the apparatus described above are merely illustrative, e.g. the division of elements is only one logical function division, and may be implemented in practice in another way, e.g. a plurality of elements or components may be combined or integrated into another system, or some features may be omitted, or may not be implemented. In addition, the mutual couplings or direct couplings or communication connections shown or discussed may be implemented through some interfaces, indirect couplings or communication connections of apparatus or elements may be electrical, mechanical or in other manners.

The elements illustrated as separated members may or may not be physically separated, and the members shown as elements may or may not be physical elements, i.e. may be located in one place, or may be distributed across multiple network elements. Some or all of the elements may be selected as necessary to achieve the objectives of the present embodiment.

In addition, the functional elements in the various embodiments of the present disclosure may be integrated in one processing element, or each element may be physically present separately, or two or more elements may be integrated in one element.

The functions, if implemented in software functional elements and sold or used as separated products, may be stored in a computer-readable storage medium. On the basis of this understanding, the essence of the technical solution of the present disclosure, or the part contributing to the related art, or part of the technical solution may be embodied in the form of a software product stored in a storage medium, and the software product includes several instructions for causing a computer device (may be a personal computer, a server, or a network device, etc.) to performs all or part of the steps of the methods described in the various embodiments of the present disclosure. The afore mentioned storage medium includes various media capable of storing program codes, such as an Universal Serial Bus (USB) flash disk, a removable hard disk, a Read-Only Memory (ROM), a Random Access Memory (RAM), a magnetic disk or an optical disk.

Furthermore, it should be noted that in the apparatus and methods of the present disclosure, it is apparent that each component or each step may be disassembled and/or recombined. Such disassembly and/or recombination should be considered as equivalents of the present disclosure. Also, the steps of performing the series of processes described above may naturally be performed chronologically according to the described order, but need not necessarily be performed chronologically, and some steps may be performed in parallel or independently of one another. It will be understood by one of ordinary skill in the art that all or any of the steps or components of the methods and apparatus of the present disclosure may be implemented in a form of hardware, firmware, software, or a combination thereof in any computing device (including a processor, a storage medium, etc.) or a network of the computing devices, which can be implemented by one of ordinary skill in the art having read the present disclosure and using their basic programming skills.

Thus, the objectives of the present disclosure may also be achieved by running a program or a set of programs on any computing device. The computing device may be a known general purpose device. Accordingly, the objectives of the present disclosure may also be achieved simply by providing a program product including program codes that implements the method or apparatus. That is, such program product also constitutes the present disclosure, and a storage medium storing such program product also constitutes the present disclosure. Obviously, the storage medium may be any known storage medium or any storage medium to be developed in the future. It should also be noted that in the apparatus and methods of the present disclosure, it is apparent that each component and/or each step may be disassembled and/or recombined. Such disassembly and/or recombination should be considered as equivalents of the present disclosure. Also, the steps for performing the series of processes described above may naturally be performed chronologically according to the order illustrated, but need not necessarily be performed chronologically. Some steps may be performed in parallel or independently of one another.

It is to be understood that the embodiments described by the embodiments of the present disclosure may be implemented in a form of hardware, software, firmware, middleware, microcode, or a combination thereof. For a hardware implementation, the processing elements may be implemented on one or more Application Specific Integrated Circuits (ASICs), Digital Signal Processors (Digital Signal Processings, DSPs), DSP Devices (DSPDs), Programmable Logic Devices (PLDs), Field-Programmable Gate Arrays (FPGAs), general-purpose processors, controllers, microcontrollers, microprocessors, other electronic elements for performing the functions of the present disclosure, or a combination thereof.

For a software implementation, the techniques of the embodiments of the present disclosure may be implemented by implementing functional modules (e.g. processes, functions) of the embodiments of the present disclosure. The software codes may be stored in a memory and executed by a processor. The memory may be implemented in the processor or outside the processor.

While the foregoing is directed to optional embodiments of the present disclosure, it will be understood by a person skilled in the art that various improvements and modifications may be made without departing from the principle of the present disclosure, and theses improvement and modifications shall also fall within the scope of protection of the present disclosure.

What is claimed is:

1. A resource allocation method operable by a base station, the base station comprising a Central Unit (CU) and a Distributed Unit (DU) connected to the CU, wherein the method comprises:
   determining, by the DU, a Sidelink (SL) resource allocation mode; and
   allocating, by the DU, SL resource for a UE according to the determined resource allocation mode and User Equipment (UE) context information,
   wherein the SL resource allocation mode determined by the DU is a resource allocation mode scheduled by a network;
   the step of allocating, by the DU, the SL resource for the UE according to the determined resource allocation mode and the UE context information, comprises:
      acquiring, by the DU, Semi-Persistent Scheduling (SPS) assistance information that is related to UE V2X context information and transmitted by the CU;
      generating, by the DU, SPS configuration information according to the stored UE V2X context information and the SPS assistance information, and transmitting, by the DU, the SPS configuration information to the CU; and
      notifying, by the DU, the UE of SPS resource configuration information;
   wherein the UE V2X context information comprises at least one of:
      V2X authorization information; a PC5 aggregate maximum bit rate (PC5 AMBR); a mapping relationship between a transmission configuration table of the SL interface and destination L2 identifications; a Quality of Service (QOS) parameter of a service flow; a mapping relationship between Scheduling Request (SR) resources of a Uu interface.

2. The resource allocation method according to claim 1, wherein the step of determining, by the DU, the SL resource allocation mode, comprises:
   determining, by the DU, the SL resource allocation mode according to a request message of the UE and a local policy.

3. A communication device, wherein the communication device is a base station, and the base station comprises a CU and a DU connected to the CU, and further comprises: a transceiver, a memory, a processor, and a program stored on the memory and executable by the processor, wherein when the processor executes the program, following steps are implemented:
   determining, by the DU, a SL resource allocation mode; and
   allocating, by the DU, SL resource for a UE according to the determined resource allocation mode and UE context information,
   wherein the SL resource allocation mode determined by the DU is a resource allocation mode scheduled by a network;
   when the processor executes the program, following steps are further implemented:
      acquiring, by the DU, SPS assistance information that is related to UE V2X context information and transmitted by the CU;
      generating, by the DU, SPS configuration information according to the stored UE V2X context information and the SPS assistance information, and transmitting, by the DU, the SPS configuration information to the CU; and
      notifying, by the DU, the UE of SPS resource configuration information;
   wherein the UE V2X context information comprises at least one of:
      V2X authorization information; a PC5 aggregate maximum bit rate (PC5 AMBR); a mapping relationship between a transmission configuration table of the SL interface and destination L2 identifications; a QoS parameter of a service flow; a mapping relationship between Scheduling Request (SR) resources of a Uu interface.

4. The communication device according to claim 3, wherein when the processor executes the program, a following step is further implemented:
   determining, by the DU, the SL resource allocation mode according to a request message of the UE and a local policy.

* * * * *